United States Patent [19]

Dow

[11] Patent Number: 4,845,930
[45] Date of Patent: Jul. 11, 1989

[54] CORN EAR CUTTER MACHINE

[75] Inventor: Paul W. Dow, Byron, N.Y.

[73] Assignee: Byron Enterprises, Inc., Byron, N.Y.

[21] Appl. No.: 189,259

[22] Filed: May 2, 1988

[51] Int. Cl.$^4$ ............................................. A01D 45/02
[52] U.S. Cl. ......................................... 56/113; 56/62;
460/38
[58] Field of Search ......... 56/98, 62, 64, 66, 113–115,
56/330, 328.1, 327.1; 130/5 K

[56] References Cited

U.S. PATENT DOCUMENTS

| | | | |
|---|---|---|---|
| 2,704,078 | 3/1955 | Scranton | 150/5 |
| 3,103,240 | 9/1963 | Minera | 56/146 |
| 3,429,111 | 2/1969 | Looker | 56/113 |
| 3,678,677 | 7/1972 | Miller | 56/327 |
| 4,143,504 | 3/1979 | Nowack | 56/98 |
| 4,581,878 | 5/1986 | Vida et al. | 56/113 |

FOREIGN PATENT DOCUMENTS 2210635 9/1973 Fed. Rep. of Germany ........ 56/113

OTHER PUBLICATIONS

R. A. Kepner et al, "Principles of Farm Machinery", AVI Publ. Co. (1978), p. 498.
FMC Fresh Market, Corn Harvester, Product Sheet (1978).

Primary Examiner—John Weiss
Attorney, Agent, or Firm—Martin LuKacher

[57] ABSTRACT

An improved Corn Ear Cutter reduces kernel damage through the use of a cushion in the form of a strip of cushioning material, preferably urethane having a hardness in the range from about 50 to 60 Shore A, which is removably installed on the stripper plates by channels which are mounted on the plates and receive the strips by sliding them into the channel. The strips support the ears of corn at the moment they are cut from the stalk and then propelled along the gap by lugs extending from gathering belts.

8 Claims, 3 Drawing Sheets

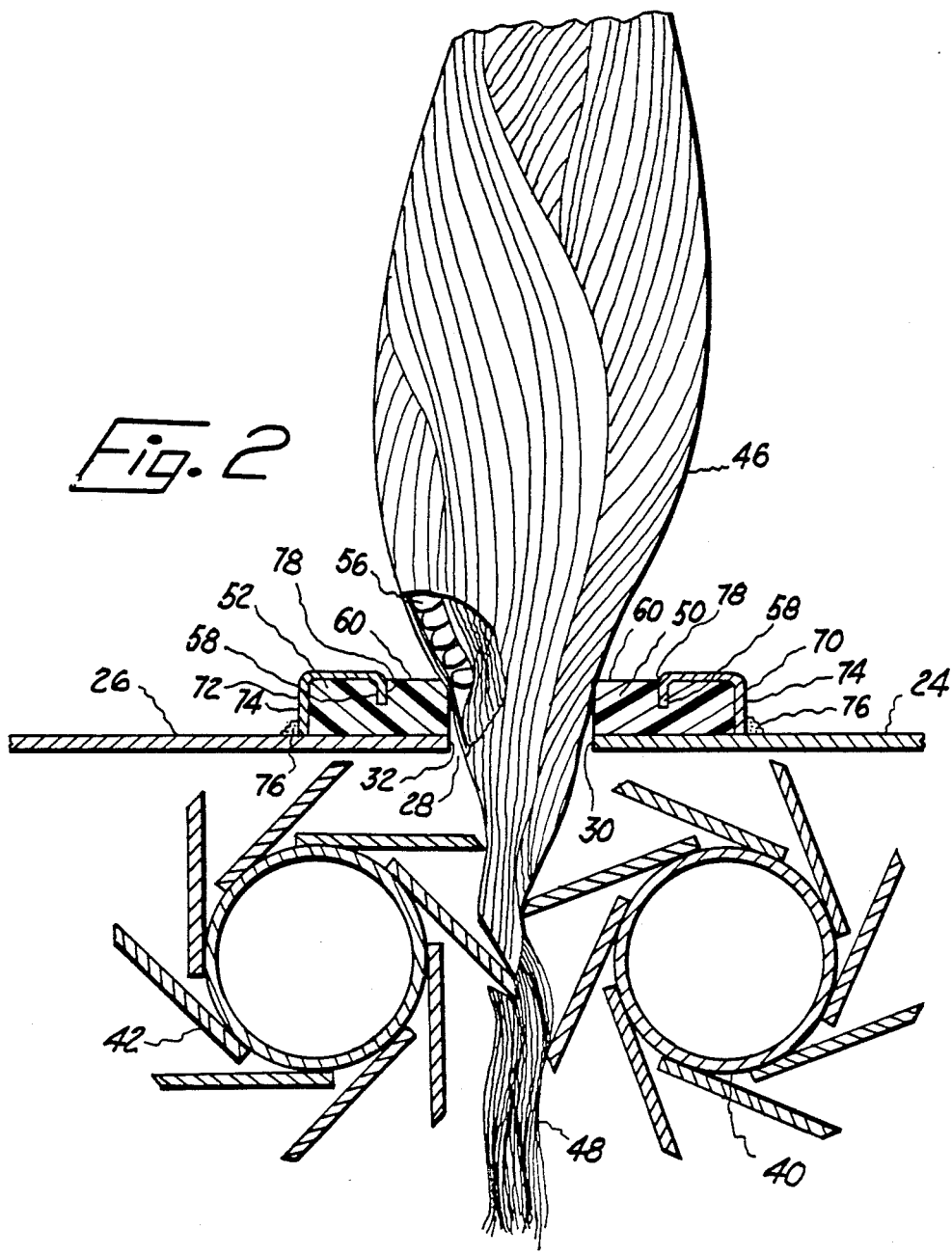

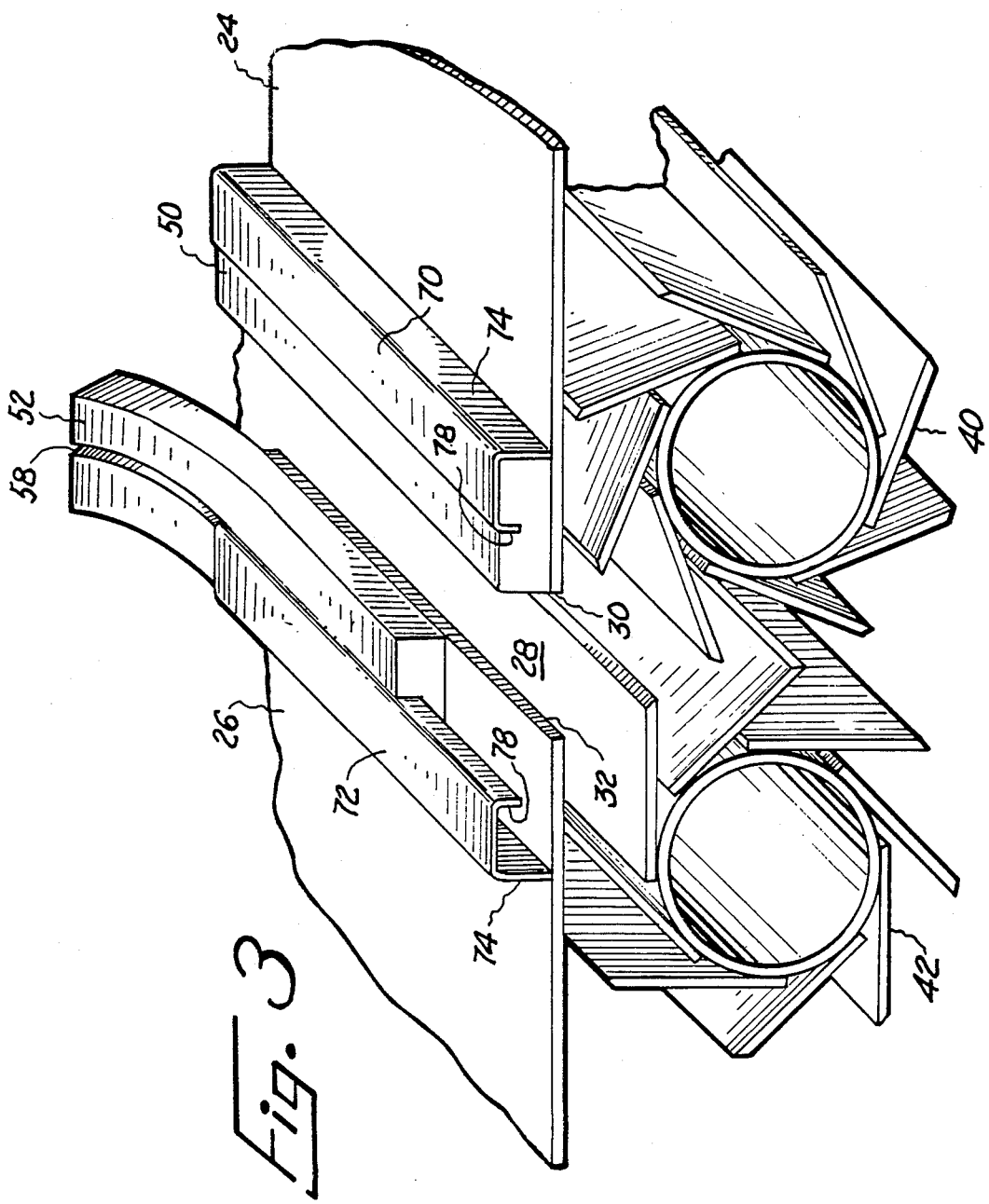

CORN EAR CUTTER MACHINE

DESCRIPTION

The present invention relates to corn harvesting machines and particularly to corn heads which gather the ears of corn and cut them from the stalks.

The invention is especially suitable for use in machines which harvest sweet corn of fresh market corn and reduces the damages to the kernels on the ears as they are cut.

In a corn harvester for detaching the ears and conveying them to a collection conveyor, the ears and stalks in a row of corn enter between stripper plates and are propelled by lugs on counter-rotating gathering belts through a gap between the plates. The ears are held upright on the plates while knife rolls cut the ears off the stalks while propelling the stalk downwards. The rolls force the ear against the stripper plates and may damage the kernels on the end of the ear near the stalk.

It is desirable to reduce the damage to these kernels without adversely effecting the operation of the harvester by burdening the operator with additional maintenance tasks, increasing the time or cost of harvesting the corn in order to protect the kernels against damage or increasing the cost of the harvesting machine in material respect.

In order to protect kernels against damage while the corn ears are severed from the stalk it has been suggested to use cushioning material on stop bars of conveyors which carry the ears and stalks through cutting rolls. This expedient requires special conveyors and militates against the use of stripper plates which are incorporated in may corn heads. Another system uses rubber covered rolls or rubber backing plates against which cutting knives operate. Such systems do not permit the use of stripper plates as contained in many corn heads. Coating the stripper plates with cushioning material is also undesirable. Then the entire corn head would need to be disassembled to replace the stripper plates or the coating thereon. This would decrease the reliability of the harvesting machine and increase the amount of maintenance or downtime for the machine.

It is the principal object of the invention to provide, in a corn harvesting machine utilizing stripper plates, facilities for cushioning the ears as they are propelled along the gap between the plates and at the moment they are cut by the counter-rotating knife rolls of the harvesting machine which does not interfere with the operation of the machine or adversely affect its reliability, and wherein cushioning means, which are used are replaceble, and even reversible, so as to facilitate maintenance of the machine and minimize the cost of providing the cushioning facilities.

Another object of the invention is to provide improved corn ear cutting apparatus which raises the ear in relation to the point at which it is cut, resulting in a longer, more desireable shank length.

Briefly described, the invention provides in a corn harvesting machine having spaced apart stripper plates along and between which ears of corn and stalks are driven or propelled through a gap between the plates and wherein there are knife rolls disposed below the stripper plates for cutting the ears off the stalks, strips of yieldable material which are disposed on the plates along the gap and define cushions on which the ears bear as they are cut from the stalk and travel along the gap. Means are attached to the plates for removably retaining the strips on the plates. Preferably the retaining means are channels having a lip. The strips may be slide into the channels and securely held by grooves into which the lips extend. The channels are open ended so that the strips may be readily replaced and even reversed for ease of maintainability and cost effectiveness. The hardness of the strips is preferably from about 50 to about 60 Shore A durometer. The strips may consist of urethane of the above-mentioned durometer.

The foregoing and other objects and advantages of the invention as well as the presently preferred embodiment thereof will become more apparent from a reading of the following description in connection with the accompanying drawings in which:

FIG. 2 is a diagrammatic, fragmentary, plan view of the corn head shown in FIG. 1 taken along the line 2—2 in FIG. 1 and showing an ear of corn in process of being cut from the stalk on which it grew;

FIG. 3 is a diagrammatic perspective view illustrating how the cushioning strip is installed on the stripper plate of the corn head.

Figure 1:
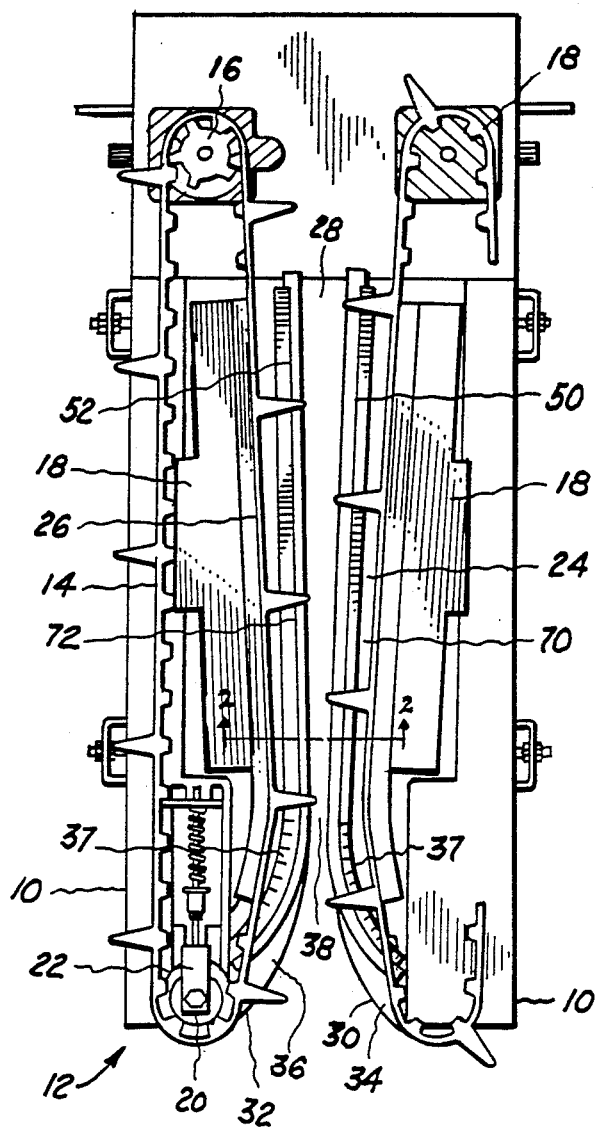
FIG. 1 is a diagrammatic, plan view of a corn head in accordance with the invention, showing in part the gathering belts and stripping plates.

Referring to the drawings, there is shown a frame 10 of a corn head 12. The covers of the corn head are removed and show one of the gathering belts 14 thereof in full and the other belt 10 in part. The belts are entrained around drive sprockets 16, one of which is shown in FIG. 1, and guided by gathering belt guides 18. The forward end of the belts are entrained around idler sprockets 20, one of which is shown in FIG. 1. Tension on the gathering belts is maintained by spring loaded idler sprocket yokes 22, one of which is shown in FIG. 1. Stripper plates 24 and 26 are mounted on the frames 10 and define a gap 28 between opposed edges 30 and 32 of the plates 24 and 26. The forward ends 34 and 36 of the plates are curved away from each other and taper to the narrowest width of the gap at 38.

As best shown in FIGS. 2 and 3, knife rolls 40 and 42 are mounted below the stripper plates and the knives thereon extend across the gap for engaging the stalks and the lower ends of the ears of corn 46 and cutting them off their stalks 48.

As so far described the corn head is conventional. The improvement provided by the invention is illustrated by elongated strips 50 and 52 of cushioning material. The material of the strips consists preferably of urethane and preferably has a hardness in the range of about 50 to 60 Shore A durometer with 60 Shore A being most preferable. This hardness had been found to provide long-life of the strips without frequency replacement, and sufficient resiliency to cushion the corn so as to minimize damage to the kernels at the lower end of the ears. These kernels are shown at 56 in FIG. 2. The strips have grooves 58 along one of the sides thereof which is shown as the top sides 60. The strips extend along the gap 28. The strips curve inwardly of the plates and away from their edges 30 and 32 at the forward ends 34 and 36 of the plates. Also, as best shown in FIG. 2, the height of the strips 50 and 52 above the plates 24 and 26 is sufficient to raise the ears in relation to the points where they are cut resulting in a longer more desirable shank length for fresh market corn than is the case without the use of the invention.

The strips are removably and reversibly received by being slid as shown in FIG. 3 under channels 70 and 72. The channels are metal members which are made flexible so that they can be curved above radii of curvature greater than the curvature of the edges 30 and 32 of the stripper plates 24 and 26 at the forward ends 34 and 36 of the stripper plates. Flexibility is provided by spaced slits 37 in the channels 50 and 52 at the end thereof which is to be curved. Any other form of curved channels may also be used. The channels have sides 74 which are attached, preferably by being welded as shown at 76 in FIG. 2 to the stripper plates 24 and 26. The tops of the channels are approximately one-half the width of the strips 50 and 52. Extending downward, from the tops of the channels and into the grooves 58, are lips 78. The lips and the channels hold the strips 50 and 52 on the stripper plates 24 and 26 with their inner portions exposed so as to engage and resiliently hold the ears of corn while they are cut and pulled down by the knives of the cutting rolls 40 and 42.

From the foregoing it will be apparent that there has been provided an improved corn harvester having facilities for protecting and preventing damage to kernels of the ears of corn as they are being cut from the stalk. While the presently preferred embodiment of the invention has been described, variations and multications thereof, within the scope of the invention, will undoubtedly suggest themselves to those skilled in the art. Accordingly, the foregoing description should be taken as illustrative and not in a limiting sense.

I claim:

1. In a corn harvesting machine having spaced apart stripper plates along and between which ears of corn and stalks are driven through a gap between the plates and wherein knife rolls are disposed below the plates for cutting the ears from the stalks, the improvement comprising strips of yieldable material disposed on said plates along said gap and defining cushions on which said ears bear as they travel along said gap, and means attached to said plates for removably retaining said strips on said plates.

2. The improvement according to claim 1 wherein said strips have a hardness from about 50 to about 60 Shore A durometer.

3. The improvement according to claim 2 wherein said strips consist of urethane material.

4. The improvement according to claim 1 wherein the height of the strips above the plates is sufficient to increase the length of the shank of the ears by about said height.

5. In a corn harvesting machine having spaced apart stripper plates along and between which ears of corn and stalks are driven through a gap between the plates and wherein rolls are disposed below the plates which facilitate cutting the ears from the stalks, the improvement comprising strips of yieldable material disposed on said plates along said gap and defining cushions on which said ears bear as they travel along said gap, means attached to said plates for removably retaining said strips on said plates which comprise channels attached to said plates along said gaps, the width of said channels being narrower than the width of said strips so as to expose said strips for engagement with the ears of corn.

6. The improvement according to claim 5 wherein said channels have outsides attached to said plates and tops extending from said outsides across the width of said channels, said channels having lips shorter than said outsides thereof which lips extend downward from said tops said strips having grooves along one of their sides which defines the width thereof, and said strips being removably received in said channels with said lips in said grooves.

7. The improvement according to claim 6 wherein said channels are curved at one end thereof, said one end being attached to the forward ends of said plates where said ears and stalks enter said harvester, said strips being retained by said channels in said curved ends.

8. The improvement according to claim 7 wherein said strips are curved away from each other along said forward ends of said plates with curvatures greater than the curvatures of said forward ends so as to taper away from said gap on said forward ends.

* * * * *